United States Patent [19]

Pearce

[11] Patent Number: 5,680,540
[45] Date of Patent: Oct. 21, 1997

[54] SUSPEND-TO-DISK SYSTEM FOR REMOVABLE HARD DRIVE

[75] Inventor: John J. Pearce, Del Valle, Tex.

[73] Assignee: Bell USA, L.P., Round Rock, Tex.

[21] Appl. No.: 692,304

[22] Filed: Aug. 5, 1996

Related U.S. Application Data

[63] Continuation of Ser. No. 381,179, Jan. 31, 1995, abandoned.

[51] Int. Cl.$^6$ ................................................. G06F 11/00
[52] U.S. Cl. ........................ 395/182.22; 395/184.01; 395/879; 364/248.1; 364/236.2; 364/273.3
[58] Field of Search .......................... 395/182.22, 182.2, 395/750, 184.01, 652, 879; 364/248.1, 236.2, 273.3

[56] References Cited

U.S. PATENT DOCUMENTS

| | | | |
|---|---|---|---|
| 4,833,554 | 5/1989 | Dalziel | 360/98.04 |
| 5,128,995 | 7/1992 | Arnold | 380/4 |
| 5,136,711 | 8/1992 | Hugard | 395/700 |
| 5,214,695 | 5/1993 | Arnold | 380/4 |
| 5,345,347 | 9/1994 | Hopkins | 360/71 |
| 5,367,682 | 11/1994 | Chang | 395/700 |
| 5,379,342 | 1/1995 | Arnold | 380/2 |
| 5,410,713 | 4/1995 | White | 395/750 |
| 5,454,110 | 9/1995 | Kannan | 395/700 |

*Primary Examiner*—Robert W. Beausoliel, Jr.
*Assistant Examiner*—Dieu-Minh Le
*Attorney, Agent, or Firm*—Skjerven, Morrill, MacPherson, Franklin & Friel, LLP; Stephen A. Terrile

[57] ABSTRACT

Method and apparatus for enabling a suspend-to-disk (S2D) state to be associated with a hard disk to which the operations of a personal computer (PC) have been suspended, rather than with the PC itself. In a preferred embodiment, responsive to initiation of an S2D operation, a partition table stored in a partition sector of the hard disk is copied to a known address within an S2D partition of the hard disk and the copy of the partition table stored in the partition sector is altered such that the S2D partition, rather than a native operating system (OS) partition, is designated as the active partition. The S2D operations continue in a conventional manner, with the state of the PC being saved to the hard disk, at which point the PC is powered off. When the PC is subsequently powered back on, the PC boots up from the S2D partition. A resume-from-disk (RFD) program writes the copy of the partition table previously stored in the S2D partition back to the partition sector and then restores the state of the PC.

34 Claims, 2 Drawing Sheets

1

SUSPEND-TO-DISK SYSTEM FOR REMOVABLE HARD DRIVE

This application is a continuation of application Ser. No. 08/381,179, filed Jan. 31, 1995, now abandoned.

TECHNICAL FIELD

The invention relates generally to computers having suspend-to-disk (S2D) functionality and, more particularly, to a mechanism or system for enabling an S2D state indication to follow the hard disk to which the operating system has been suspended, rather than the computer, such that a resume-from-disk (RFD) may be executed with the hard disk in another computer.

BACKGROUND OF THE INVENTION

Portable personal computers (PCs) were first introduced in the early 1980s and have since enjoyed great commercial success and consumer acceptance. As the portable PC market has grown, users have begun to demand lighter weight, lower volume PCs that can be used for longer periods of time between battery charges. Meeting these demands has proved challenging in view of the fact that most portable PCs now support peripheral devices previously available only on desktop PCs. The additional peripherals greatly increase overall power consumption, making it difficult to achieve an optimal level of functionality while maintaining an acceptable battery life. Furthermore, although for reasons other than maximizing battery life, it has become desirable to more efficiently manage power consumption of desktop PCs in order to minimize overall operating costs.

Because many of the components and peripheral devices of both desktop and portable PCs consume a great deal of power even when they are idle, power management systems have been developed which cause each component or peripheral device to operate in the lowest power consumption mode with respect to present demands on the system. For example, many PCs are capable of operating in several different reduced power consumption modes, such as "standby" and "suspend-to-disk" (S2D).

Standby mode essentially puts the PC to sleep by slowing the processor and system clock, turning off the LCD backlight and stopping hard drive activity. Alternatively, S2D saves the current system status, including device states, application program status, and the like, by writing the contents of RAM to the hard disk, at which point power is removed fore all devices. When work is resumed, the hard disk copy is copied back to the RAM and operation resumes from the point at which it was interrupted.

In PCs having S2D functionality, means must be provided to enable the saved PC state to be restored so that the user may continue working from the point at which the S2D was previously executed. In other words, some mechanism must be provided for enabling a "resume-from-disk" (RFD) to be performed. This can be complicated when the hard disk is removable, which is the case with some portable PCs.

One solution to this problem has been to implement a flag in a CMOS memory device of the PC for indicating that an RFD must be performed before PC operations can be restarted. This mechanism has proven to be sufficient under certain, somewhat limited, circumstances, in particular, cases in which the hard disk to which a first PC's operations have been suspended has not been replaced with another hard disk or inserted into a second PC when an RFD is attempted from the first or second PC, respectively. However, it is not inconceivable that a user would want to be able to suspend operations of a first PC to a first hard disk and then later insert the hard disk into a second PC, power up the PC and resume working from the point at which the S2D was previously executed. Similarly, it would be advantageous for a user to be able to alternate between use of two or more hard disks, each of which may have different operating systems or applications software loaded thereon, in the same PC by executing an S2D prior to removing a first hard disk and executing an RFD from a newly inserted disk. In such cases, the above-described CMOS flag, being so closely tied to the particular hard disk and PC used to execute the S2D, would result in both the hard disk and the PC from which it was removed remaining locked in an incomplete S2D state until the hard disk is reinserted and an RFD performed.

Therefore, what is needed is a mechanism for enabling an S2D state to follow a hard disk such that a hard disk to which operations have been suspended may be used in multiple PCs.

SUMMARY OF THE INVENTION

The foregoing problems are solved and a technical advance is achieved by method and apparatus for enabling an S2D state to be associated with a hard disk to which the operations of a PC have been suspended, rather than with the PC itself. In a departure from the art, responsive to initiation of an S2D operation, a partition table stored in a partition sector of the hard disk is copied to a known address within an S2D partition of the hard disk and the copy of the partition table stored in the partition sector is altered such that the S2D partition, rather than a native operating system (OS) partition, is designated as the active, or bootable, partition. The S2D operations continue in a conventional manner, with the state of the PC being saved to the hard disk, at which point the PC is powered off. When the PC is subsequently powered back on, after the conventional POST routines are performed, the PC boots up from the S2D partition. A resume-from-disk (RFD) routine stored in the S2D partition writes the copy of the partition table stored in the S2D partition back to the partition sector and then restores the state of the PC by copying the contents of the S2D partition back to system memory. In this manner, the S2D state follows the hard disk rather than the PC.

A technical advantage achieved with the present invention is that it enables multiple users each to have their own hard disk, but to share one or more portable PCs by enabling them to execute an S2D operation on one PC and remove the hard disk and then later insert the hard disk into the same or another PC and resume operations where they previously left off.

A farther technical advantage achieved with the invention is that it enables a user to execute an S2D while one hard disk is installed in a PC, replace that hard disk with a second hard disk to which operations of the same or another PC had previously been suspended, and resume operations from the second hard disk.

A further technical advantage achieved with the invention is that it enables a user to selectively alternate between use of multiple hard disks, each having a different set of operating systems and/or applications programs stored thereon.

DETAILED DESCRIPTION OF THE PREFERRED EMBODIMENT

Figure 1:
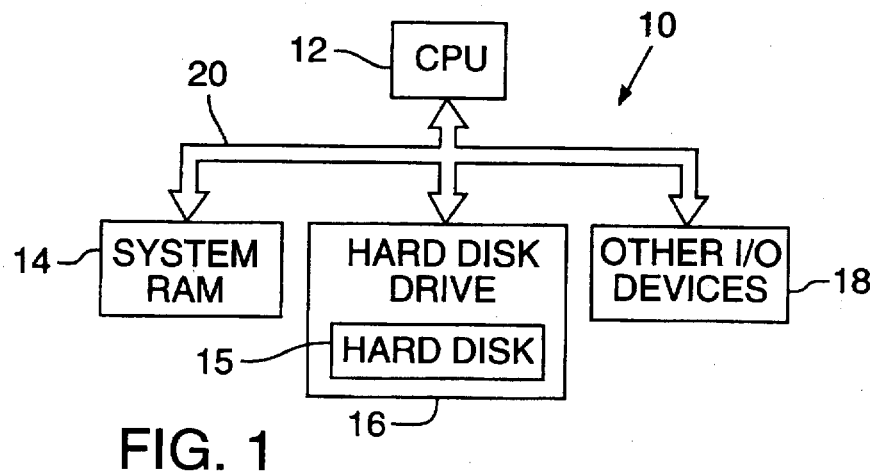
FIG. 1 is a block diagram of a PC in which a suspend-to-disk utility embodying features of the present invention may be implemented.

Referring to FIG. 1, a personal computer (PC) having suspend-to-disk (S2D) functionality is designated by a reference numeral 10. The PC 10 comprises a central processing unit (CPU) 12, system random access memory (RAM) 14, a hard, or fixed, disk 15 and associated hard disk drive 16, and other I/O devices, collectively designated by a reference numeral 18, all interconnected via a bus 20. When an S2D operation is initiated, for example, by a user's pressing a designated key or button (not shown) of one of the I/O devices 18, the contents of the RAM 14 are copied to an S2D partition (FIG. 2A) of the hard disk 15 in a manner to be described with reference to FIG. 3A, and the PC 10 powers down. When the PC is subsequently powered back up, the information stored in the S2D partition is written back to the RAM 14 in a manner to be described with reference to FIG. 3B and PC 10 operations resume from the point at which the S2D operation was previously executed.

Figure 2A:
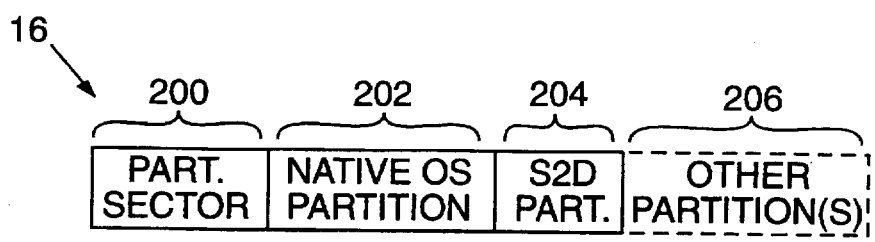
FIG. 2A is a block diagram illustrating an exemplary format of a hard disk of the PC of FIG. 1.

FIG. 2A is a block diagram of an exemplary format of the hard disk 15. The hard disk 15 includes a partition sector 200, which is the structure that all IBM compatible PCs use to define the partitions of a hard disk, as well as a native operating system (OS) partition 202 and an S2D partition 204. In one embodiment, the S2D partition 204 is of a fixed size sufficient to store the entire contents of the RAM 14. In an alternative preferred embodiment, the S2D partition 204 comprises an extended portion, the size and location of which is dynamically adjusted based on the size of the RAM 14 at a given time, and a fixed portion for indicating the location of the adjustable portion, as described in detail in commonly assigned, copending U.S. patent application Ser. No. 08/370,595, filed Jan. 20, 1995, (Attorney Docket No. DC-00691) entitled "AUTOMATIC ADJUSTMENT OF DISK SPACE REQUIRED FOR SUSPEND-TO-DISK OPERATION." The hard disk 15 may also optionally include as many as two additional partitions, collectively designated by a reference numeral 206, although the inclusion of such additional partitions 206 is not necessary to the operation of the present invention.

Figure 2B:
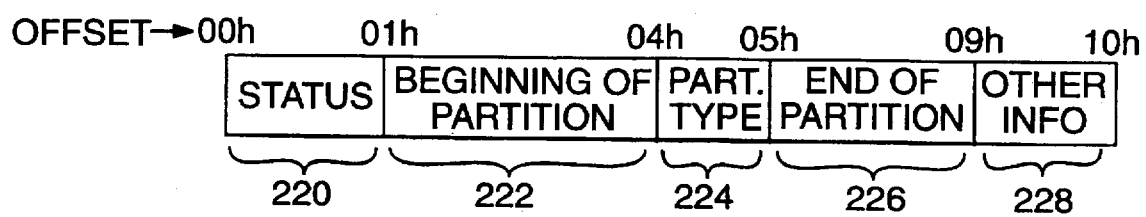
FIG. 2B is a block diagram illustrating the format of a partition table entry of the hard disk of FIG. 2A.

Although not shown, it is understood that the partition sector includes partition code and a partition table comprising four table entries numbered 0 through 3, each of which corresponds to a partition of the hard disk 15, such that, as previously implied, the hard disk 15 may be formatted to include up to four partitions. FIG. 2B illustrates the format of each of the four partition table entries. As shown in FIG. 2B, a first field 220 of each entry indicates whether the partition associated with the entry is active, or bootable, it being understood that only one partition may be designated as active at boot-up of the PC 10. A second field 222 of each entry indicates the physical location of the beginning of the partition on the hard disk 15 in terms of head, sector and cylinder. A third field 224 of each entry indicates the system type of the partition; it is this field that is used to identify the entry associated with the partition type; it is this, for example, native OS or S2D. A fourth field 226 of each entry indicates the physical location of the end of the partition on the hard disk 15 in terms of head, sector and cylinder. A remaining field 228 of each entry contains additional information about the partition. Typically, the first entry in the partition table (entry 0) defines the native OS partition 202. One of the remaining partition table entries, for example, entry 1, defines the S2D partition 204.

In operation, each time the PC 10 is powered on or reset, BIOS code loads the partition sector 200 into system RAM 14 and begins executing the partition code. The partition code examines the partition table to determine which partition is active and causes the PC 10 to boot up using the boot sector code (not shown) of the active partition. Typically, the native OS partition 202 will be designated the active partition. However, as will be described in detail with reference to FIG. 3A, in accordance with a feature of the present invention, when an S2D is executed, the partition table is altered such that the S2D partition is designated as the active partition.

Figure 3A:
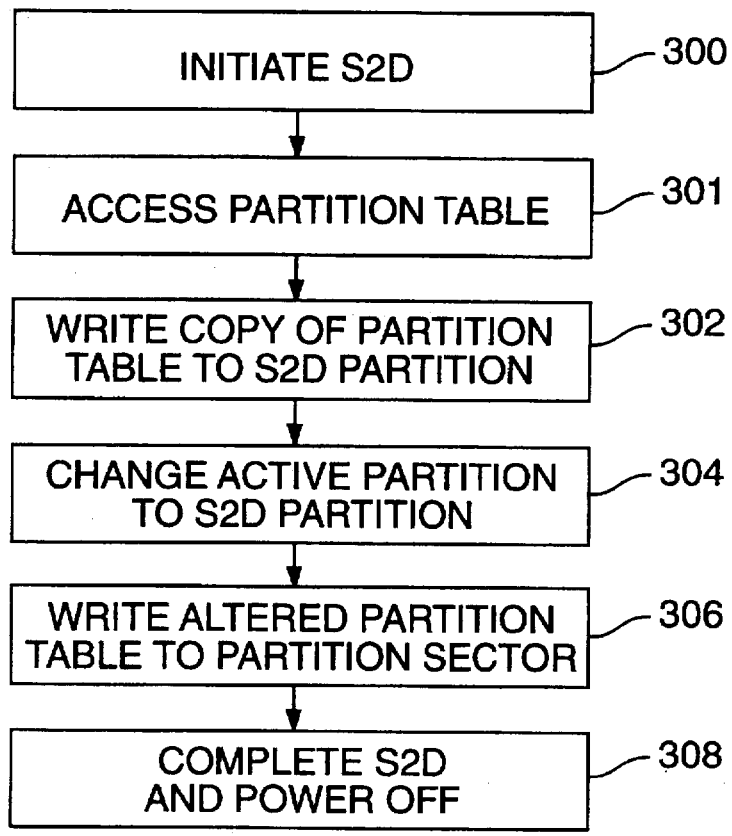
FIG. 3A is a flowchart of a suspend-to-disk routine embodying features of the present invention.

FIG. 3A is a flowchart of an S2D routine embodying features of the present invention. It will be appreciated that instructions for performing the illustrated routine will be stored in a memory device, for example, system RAM 14, for execution by the CPU 12. In step 300, the S2D routine is initiated, for example, by a user's depressing a key designated for that purpose. In step 301, the partition table stored in the partition sector 200 is accessed and in step 302, a copy of the partition table is written to a known location in the S2D partition 204 reserved for that purpose. In step 304, the active partition is changed from the native OS partition 202 to the S2D partition 204 by changing the status entry 220 of the OS partition table entry (entry 0) from 80 h (active) to 00 h (inactive) and changing the status entry 220 of the S2D partition table entry (entry 1) from 00 h (inactive) to 80 h (active). In step 306, the altered partition table is written back to the partition sector 200. Accordingly, upon completion of step 306, the partition table stored in the partition sector 220 designates the S2D partition as the active, i.e., "bootable," sector, whereas the partition table copy stored in the S2D partition 204 designates the OS partition 202 as the active sector.

In step 308, any remaining S2D operations, including, in particular, all operations necessary to save the state of the PC 10 to the S2D partition 204 of the hard disk 15, are executed and the PC 10 is powered down. At this point, the hard disk drive 16 may be removed from the PC 10 for later installation in the PC 10 or another PC (not shown).

Figure 3B:
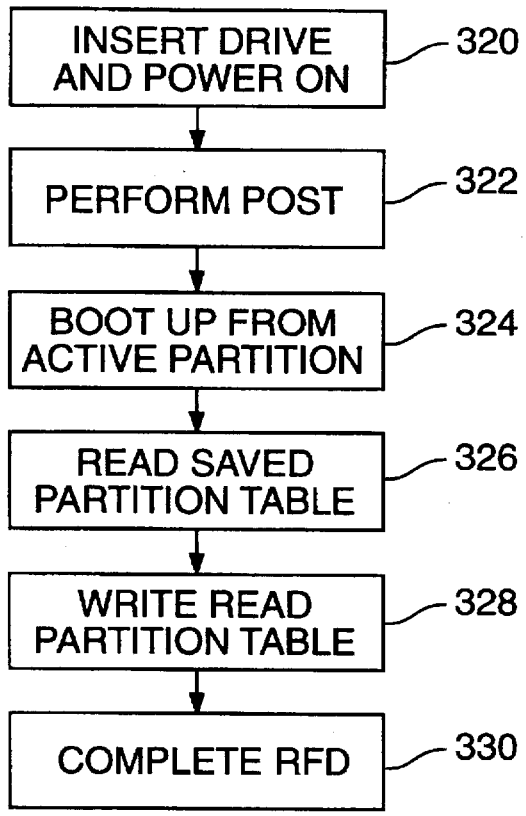
FIG. 3B is a flowchart of a resume-from-disk routine embodying features of the present invention.

Referring to FIG. 3B, when the user desires to resume use of the PC 10 from the point at which operations were previously suspended to the hard disk 15, as described above with reference to FIG. 3A, he or she merely reinstalls the hard disk drive 16 into the PC 10, or similar PC (not shown) and then powers up or resets the PC (step 320). After the normal POST procedures have been performed (step 322), execution proceeds to step 324, in which the PC boots up from the active partition; that is, the S2D partition 204. In step 326, RFD code stored in the S2D partition 204 is executed, causing the partition table stored in the S2D partition 204 to be read from the hard disk 15 and then written back to the partition sector 200 in step 328. In this manner, the native OS partition 202 is redesignated as the active partition. In step 330, the remainder of the RFD code is executed to restore the state of the PC 10 from the S2D partition 204 of the hard disk 15, are executed and operation is resumed as usual.

In this manner, the S2D state follows the hard drive, rather than the PC 10. This is advantageous for many reasons, for example, it would enable a user in a large corporation to have his or her own hard disk, but share a portable PC with other users. At any given time during operation of the PC, the user can execute an S2D, remove the hard drive, and give the PC to someone else. At a later time, the user can acquire another PC, reinstall the hard drive, power on the PC and continue working where he or she previously left off.

Alternatively, a user may have two hard drives, each loaded with different operating systems and/or applications. As he or she progresses through the work day, the above-described S2D operation may be used to enable the user easily to switch among operating systems and applications, without having to unload and reload software each time.

It is understood that the present invention can take many forms and embodiments. The embodiments shown herein are intended to illustrate rather than to limit the invention, it being appreciated that variations may be made without departing from the spirit or the scope of the invention. For example, in the preferred embodiment, the PC from which the hard disk drive 16 is removed after an S2D must have similar capabilities as the PC in which the hard drive is later inserted to do an RFD; however, it is anticipated that this need not be the case. In addition, the original partition table information could be saved in any other known manner.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A method for performing suspend-to-disk (S2D) state for a first computer data processing system characterized by a central processing unit, a system memory, a permanent data storage including a disk and control means for reading and writing data from and to said disk, respectively, bus system interconnecting said central processing unit, said system memory, and said permanent data storage, wherein instructions are recorded on said disk of said permanent data storage in sector locations thereon determined by a partition table stored on said disk, the method comprising the steps of:

identifying said partition sector of said disk;

writing a copy of said partition table stored in said partition sector to a S2D partition of said disk;

altering said partition table stored in said partition sector of said disk to designate said S2D partition as the bootable partition; and including in said S2D partition a resume-from-disk (RFD) routine to write the partition table stored in the S2D partition back to said partition sector of said disk and copying the contents of said S2D partition back to system memory.

2. The method of claim 1 wherein said first computer includes system memory, the method further comprising, responsive to said S2D command:

copying contents of said first computer system memory to said hard disk; and powering down said first computer.

3. The method of claim 2 further comprising, subsequent to said powering down and responsive to a resume-from-disk (RFD) command:

booting said first computer from said S2D partition; and overwriting said altered partition table copy stored in said partition sector with said partition table copy stored in said S2D partition.

4. The method of claim 3 further comprising, subsequent to said powering down and responsive to said RFD command, copying said copied first computer system memory contents from said hard disk back to said first computer system memory.

5. The method of claim 2 further comprising, subsequent to said powering down:

removing said hard disk from said first computer;

installing said hard disk in a second computer; and responsive to a resume-from-disk (RFD) command:

booting said second computer from said S2D partition; and overwriting said altered partition table copy stored in said partition sector with said partition table copy stored in said S2D partition.

6. The method of claim 5 wherein said second computer includes system memory, the method further comprising, responsive to said RFD command, copying said copied first computer system memory contents from said hard disk to said second computer system memory.

7. The method of claim 5 or claim 6 wherein said first and second computers are the same computer.

8. The method of claim 5 or claim 6 wherein said first and second computers are equivalent.

9. A method for enabling a suspend-to-disk (S2D) state of a first computer having system memory to follow a hard disk to which operations of said first computer have been suspended, said hard disk comprising a partition sector and an S2D partition, the method comprising:

responsive to an S2D command:

writing a copy of a partition table stored in said partition sector to said S2D partition, said partition table comprising a plurality of partition table entries corresponding to a plurality of partitions of said hard disk and designating one of said hard disk partitions as an active partition;

altering a copy of said partition table to designate said S2D partition as said active partition;

overwriting said partition table stored in said partition sector with said altered partition table copy;

copying contents of said first computer system memory to said hard disk; and powering down said first computer.

10. The method of claim 9 further comprising, subsequent to said powering down and responsive to a resume-from-disk (RFD) command:

booting a computer in which said hard disk is currently installed from said active partition;

overwriting said altered partition table copy stored in said partition sector with said partition table copy stored in said S2D partition; and copying said copied first computer system memory contents from said hard disk to a system memory of said computer in which said hard disk is currently installed.

11. The method of claim 10 further comprising, subsequent to said powering down and prior to said booting:

removing said hard disk from said first computer, and installing said hard disk in a second computer.

12. The method of claim 10 wherein said computer in which said hard drive is currently installed is said first computer.

13. The method of claim 11 wherein said computer in which said hard drive is currently installed is a computer other than said first computer.

14. The method of claim 11 wherein said first and second computers have similar system parameters.

15. Apparatus for enabling a suspend-to-disk (S2D) state of a first computer to follow a hard disk to which operations of said first computer have been suspended, said hard disk comprising a partition sector and an S2D partition, the apparatus comprising:

means responsive to an S2D command for:

writing a copy of a partition table stored in said partition sector to said S2D partition, said partition table comprising a plurality of partition table entries corresponding to a plurality of partitions of said hard disk and designating one of said hard disk partitions as an active partition;

altering a copy of said partition table to designate said S2D partition as said active partition; and overwriting said partition table stored in said partition sector with said altered partition table copy.

16. The apparatus of claim 15 wherein said first computer includes system memory, the apparatus further comprising means responsive to said S2D command for copying contents of said first computer system memory to said hard disk and powering down said first computer.

17. The apparatus of claim 16 further comprising means responsive to a resume-from-disk (RFD) command for booting a computer in which said hard disk is currently installed from said active partition and overwriting said altered partition table copy stored in said partition sector with said partition table copy stored in said S2D partition.

18. The apparatus of claim 17 further comprising means responsive to said RFD command for copying said copied first computer system memory contents from said hard disk to a system memory of said computer in which said hard disk is currently installed.

19. The apparatus of claim 17 or claim 18 wherein said first computer and said computer in which said hard disk is currently installed are the same computer.

20. The apparatus of claim 17 or claim 18 wherein said first computer and said computer in which said hard disk is currently installed are equivalent.

21. Apparatus for enabling a suspend-to-disk (S2D) state of a first computer having system memory to follow a hard disk to which operations of said first computer have been suspended, said hard disk comprising a partition sector and an S2D partition, the apparatus comprising:

means for writing a copy of a partition table stored in said partition sector to said S2D partition, said partition table comprising a plurality of partition table entries corresponding to a plurality of partitions of said hard disk and designating one of said hard disk partitions as an active partition;

means for altering a copy of said partition table to designate said S2D partition as said active partition;

means for overwriting said partition table stored in said partition sector with said altered partition table copy;

means for copying contents of said first computer system memory to said hard disk; and means for powering down said first computer.

22. The apparatus of claim 21 further comprising logic executable by a processor of a computer in which said hard disk is installed during a resume-from-disk (RFD) operation responsive to an RFD command for booting said computer in which said hard disk is installed during said RFD operation from said active partition and overwriting said altered partition table copy stored in said partition sector with said partition table copy stored in said S2D partition.

23. The apparatus of claim 22 further comprising logic executable by said processor of said computer in which said hard disk is installed during said RFD operation for copying said copied first system memory contents from said hard disk to system memory of said computer in which said hard disk is installed during said RFD operation.

24. The apparatus of claim 22 or claim 23 wherein said first computer and said computer in which said hard disk is installed during said RFD operation are the same computer.

25. The apparatus of claim 22 or claim 23 wherein said first computer and said computer in which said hard disk is installed during an RFD operation are equivalent.

26. Apparatus for enabling a suspend-to-disk (S2D) state of a first computer to follow a hard disk to which operations of said first computer have been suspended, said hard disk comprising a partition sector and an S2D partition, the apparatus comprising:

means responsive to an S2D command for:

writing a copy of a partition table stored in said partition sector to said S2D partition, said partition table comprising a plurality of partition table entries corresponding to a plurality of partitions of said hard disk and designating one of said hard disk partitions as an active partition;

altering a copy of said partition table to designate said S2D partition as said active partition; and overwriting said partition table stored in said partition sector with said altered partition table copy; and means responsive to a resume-from-disk (RFD) command for booting a second computer in which said hard disk is currently installed from said active partition and overwriting said altered partition table copy stored in said partition sector with said partition table copy stored in said S2D partition.

27. The apparatus of claim 26 wherein said first computer includes system memory, the apparatus further comprising means responsive to said S2D command for copying contents of said first computer system memory to said hard disk and powering down said first computer.

28. The apparatus of claim 27 further comprising means responsive to said RFD command for copying said copied first computer system memory contents from said hard disk to a system memory of said second computer in which said hard disk is currently installed.

29. The apparatus of claim 28 wherein said first computer and said second computer in which said hard disk is currently installed are the same computer.

30. The apparatus of claim 28 wherein said first computer and said second computer in which said hard disk is currently installed are equivalent.

31. Apparatus for enabling a suspend-to-disk (S2D) state of a first computer having system memory to follow a hard disk to which operations of said first computer have been suspended, said hard disk comprising s partition sector and an S2D partition, the apparatus comprising:

means for writing a copy of a partition table stored in said partition sector to said S2D partition, said partition table comprising s plurality of partition table entries corresponding to a plurality of partitions of said hard disk and designating one of said hard disk partitions as an active partition;

means for altering a copy of said partition table to designate said S2D partition as said active partition;

means for overwriting said partition table stored in said partition sector with said altered partition table copy;

means for copying contents of said first computer system memory to said hard disk;

means for powering down said first computer; and logic executable by a processor of a second computer in which said hard disk is installed during a resume-from-disk (RFD) operation responsive to an RFD command for booting said second computer in which said hard disk is installed during said RFD operation from said active partition and overwriting said altered partition table copy stored in said partition sector with said partition table copy stored in said S2D partition.

32. The apparatus of claim 33 further comprising logic executable by said processor of said second computer in which said hard disk is installed during said RFD operation for copying said copied first system memory contents from said hard disk to system memory of said second computer in which said hard disk is installed during said RFD operation.

33. The apparatus of claim 31 or 32 wherein said first computer and said second computer in which said hard disk is installed during said RFD operation are the same computer.

34. The apparatus of claim 31 or 32 wherein said first computer and said second computer in which said hard disk is installed during an RFD operation are equivalent.

* * * * *

UNITED STATES PATENT AND TRADEMARK OFFICE
CERTIFICATE OF CORRECTION

PATENT NO.    :   5,680,540
DATED         :   October 21, 1997
INVENTOR(S)   :   John J. Pearce It is certified that error appears in the above-identified patent and that said Letters Patent is hereby corrected as shown below:

Col. 2, line 51
Delete "farther" and insert --further--

Col. 8, line 52
Delete "s" and insert --a--

Col. 8, line 56
Delete "s" and insert --a--

Signed and Sealed this

Sixth Day of October, 1998

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO.     : 5,680,540           Page 1 of 1
DATED          : October 21, 1997
INVENTOR(S)    : John J. Pearce It is certified that error appears in the above-identified patent and that said Letters Patent is hereby corrected as shown below:

Title page,
Item [73], Assignee, please amend as follows:
Please delete "Bell USA, L.P., Round Rock, Texas" and replace with -- Dell USA L.P., Round Rock, Texas --

Signed and Sealed this

Nineteenth Day of August, 2003

JAMES E. ROGAN
*Director of the United States Patent and Trademark Office*